United States Patent
Holeman, Sr. et al.

(10) Patent No.: US 6,934,876 B1
(45) Date of Patent: Aug. 23, 2005

(54) REGISTRATION SYSTEM AND METHOD IN A COMMUNICATION NETWORK

(76) Inventors: James L. Holeman, Sr., 8018 Tea Garden Rd., Huntsville, AL (US) 35802; Glenn P. Bradford, 124 Stacy Cir. NE, Huntsville, AL (US) 35811

(*) Notice: Subject to any disclaimer, the term of this patent is extended or adjusted under 35 U.S.C. 154(b) by 600 days.

(21) Appl. No.: 10/171,713

(22) Filed: Jun. 14, 2002

(51) Int. Cl.$^7$ .............................................. G06F 11/00
(52) U.S. Cl. ........................................ 714/4; 370/399
(58) Field of Search ............................. 714/4, 18, 27, 714/43, 56; 370/399, 400, 449, 450; 709/239, 709/240

(56) References Cited

U.S. PATENT DOCUMENTS

| | | | |
|---|---|---|---|
| 4,491,946 A | 1/1985 | Kryskow, Jr. et al. | |
| 4,506,360 A | 3/1985 | Kryskow, Jr. et al. | |
| 4,852,091 A | 7/1989 | Li | |
| 5,377,187 A | 12/1994 | Spiotta et al. | |
| 5,413,411 A | 5/1995 | Ebersohl | |
| 5,530,703 A * | 6/1996 | Liu et al. | 370/255 |
| 5,537,549 A * | 7/1996 | Gee et al. | 709/224 |
| 5,712,852 A | 1/1998 | Wilson | |
| 6,091,738 A | 7/2000 | Tsujikado et al. | |
| 6,098,111 A * | 8/2000 | Maegawa et al. | 719/310 |
| 6,163,540 A * | 12/2000 | Cheung et al. | 370/394 |
| 6,173,157 B1 * | 1/2001 | Godoroja et al. | 340/7.41 |
| 6,178,445 B1 | 1/2001 | Dawkins et al. | |
| 6,192,397 B1 | 2/2001 | Thompson | |
| 6,272,344 B1 * | 8/2001 | Kojima | 455/435.1 |
| 6,339,790 B1 * | 1/2002 | Inoue | 709/224 |
| 6,424,639 B1 * | 7/2002 | Lioy et al. | 370/338 |
| 6,522,880 B1 * | 2/2003 | Verma et al. | 455/436 |
| 2002/0174168 A1 * | 11/2002 | Beukema et al. | 709/201 |
| 2004/0004966 A1 * | 1/2004 | Foster et al. | 370/399 |

* cited by examiner

*Primary Examiner*—Nadeem Iqbal
(74) *Attorney, Agent, or Firm*—Lanier Ford Shaver & Payne PC (57) ABSTRACT

A system and corresponding methods for registering network units or nodes into a data communication network is provided. The data communication network includes a base node that controls one or more other remote nodes on the network. The base node automatically sets-up or initializes the network when the number and identity of the remote nodes is not previously known. In one embodiment, the base node utilizes a concurrent, bit-wise serial transmission of addresses from the remote nodes to determine the highest valued address among the responding remote nodes. A responding remote node with a higher value address is registered prior to another responding remote node with a lower value address. The remote node with the lower value address withdraws at some point during the registration process when the remote node determines that there is another responding remote node with a higher value address. Once registration has occurred, the base node can communicate with the registered remote node.

54 Claims, 6 Drawing Sheets

REGISTRATION SYSTEM AND METHOD IN A COMMUNICATION NETWORK

This invention was made with U.S. Government support under subcontract number NRC-IDIQ-98-0008 awarded by the U.S. Army Aviation and Missile Command. The government may have certain rights in this invention.

BACKGROUND

1. Field The present invention relates generally to registration systems and, more particularly, to registering nodes in a communication network.

2. Description of the Related Art

In conventional time division multiplex data communication systems where the exact participants are unknown, a procedure must exist to account for and handle the possibility of messages being transmitted at substantially the same time and, thus, being "garbled." The procedures to handle the garbled messages vary depending on the communication system. In a classic ALOHA network, a network participant transmits its message and listens at the same time, or after some predefined delay. If the transmitting network participant hears its own message garbled, then the network participant backs-off and waits a predetermined amount of time before retransmitting its message.

A variation to the classic ALOHA network is the slotted ALOHA network scheme. Slotted ALOHA improves on the performance of a pure ALOHA network by requiring the network participants to transmit on predefined time boundaries. A drawback to this approach is its requirement that one participant provide a timing marker for the other network participants.

Carrier Sense Multiple Access (CSMA) networks provide an improvement over ALOHA networks by requiring that each participant listen for another transmission before attempting to transmit. In Carrier Sense Multiple Access with Collision Detection (CSMA/CD) schemes (e.g., IEEE 802.3), a sender (i.e., a transmitting participant) must determine that the voltage level on the medium is not greater than that generated by the sender, itself. If the detected voltage level is greater, a collision is detected (e.g., another participant is also transmitting). In IEEE 802.3, the sender will then follow a binary exponential back-off scheme until it can send its message in the clear (i.e., without collision).

Multiple Access with Collision Avoidance (MACA) techniques use the broadcast of RTS and CTS messages to minimize the likelihood of collisions. However, when a collision does occur, a binary exponential back-off scheme is used to determine when a retry is to be attempted.

The aforementioned methodologies have at least two things in common. First, each participant in the network is responsible for determining if a collision has occurred. Second, retries occur at random times after the collision, either over a fixed period of time or over a period of time that continually expands, possibly exponentially. These two factors are the basis for potential drawbacks with the aforementioned schemes.

One drawback is that each unit in the network must be capable of detecting collisions, potentially even while the unit is transmitting a message. In radio-frequency-based networks, this may be a difficult, if not impossible, task. Another drawback is that, if a network is lightly loaded and the time within which units may retry transmissions after detecting a collision is fixed, there may be a significant amount of wasted time. Alternatively, if the network is heavily loaded, collisions may be excessive, and no message gets through. If the retry time is permitted to expand, then the delay time might, again, be excessive.

One possible solution to the bus contention and message collision problems is to use a command-response scheme. The command-response approach requires a primary, or "base," unit that controls all communication between the network participants. That is, the secondary, or "remote," units will not transmit unless commanded by the base. While this addresses the bus contention problem once the network is established, a drawback is the requirement that the base unit know the identifiers of all remote units on the network. The problem of initially registering the remotes into the network when their number and identifiers are unknown still remain. One approach would be to use the aforementioned collision resolution methodologies to initially set up the network, but this would incur all the problems of inherent in the collision resolution methodologies, if only for the initialization phase.

Thus, a system and method for initializing a data communication network without a priori knowledge of the number of network participants and their respective identifiers, and which avoids the issues and problems associated with collision resolution methodologies is desired. Furthermore, a system and method of registration that is accomplished in a deterministic amount of time is also desired.

SUMMARY

The present disclosure is directed to a system and corresponding methods for registering network units or nodes into a data communication network. The data communication network includes a principal communication unit (i.e., a "base node") that controls one or more other remote nodes on the network. The base node automatically sets-up or initializes the network when the number and identity of the remote nodes is not previously known. "Unit," "node," and any variation thereof, is used interchangeably herein.

In one embodiment, a base node utilizes a concurrent, bit-wise serial transmission of addresses from the remote nodes to determine the highest valued address among the responding remote nodes. For example, a responding remote node with a higher value address is registered prior to another responding remote node with a lower value address. The remote node with the lower value address withdraws at some point during the registration process when the remote node determines that there is another responding remote node with a higher value address. One technical advantage is that the time required to register a single remote node is deterministic and is independent of the number of remote nodes responding. Once registration has occurred, the base node can communicate with the registered remote node. Another technical advantage of the registration system and corresponding methods is the avoidance of contention and collision during the registration process, thus, resulting in deterministic communication, and registration, times.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method of registering nodes in a network includes: transmitting a register request; receiving a first register response; completing a unit of an identifier information based on the received register response; transmitting a second register response based on the first register response; determining whether the identifier information is complete; and responsive to determining that the identifier information is not complete, repeating the receiving a first register response to the determining whether the identifier information is complete.

In another embodiment, a method of participating in a registration process includes: receiving a registration request; identifying a current unit of an identifier information to transmit; transmitting a first register response based on the current unit of the identifier information; receiving a second register response; determining whether the second register response is an expected register response; responsive to determining that the second register response is the expected register response, determining whether the identifier information is processed; and responsive to determining that the identifier information is not processed, repeating the identifying a current unit of an identifier information to transmit to determining whether the identifier information is processed.

In still another embodiment, a method of participating in a registration process includes: receiving a registration request; identifying a current unit of an identifier information to transmit; delaying for a time period based on the current unit of the identifier information; during the delay time period, determining whether data is being transmitted; responsive to determining that data is being transmitted during the delay time period, withdrawing from the registration process; responsive to determining that data is not being transmitted during the delay time period, determining whether the identifier information is processed; and responsive to determining that the identifier information is not processed, repeating the identifying a current unit of an identifier information to transmit to determining whether the identifier information is processed.

In yet another embodiment, a computer-readable storage medium has stored thereon computer instructions that, when executed by a computer, cause the computer to: transmit a register request; listen for and receive a first register response; complete a unit of an identifier information based on the received register response; transmit a second register response based on the first register response; determine whether the identifier information is complete; and responsive to determining that the identifier information is not complete, repeat the listen for and receive a first register response to the determine whether the identifier information is complete.

In a further embodiment, a computer-readable storage medium has stored thereon computer instructions that, when executed by a computer, cause the computer to: listen for and receive a registration request; identify a current unit of an identifier information to transmit; transmit a first register response based on the current unit of the identifier information; listen for and receive a second register response; determine whether the second register response is an expected register response; responsive to determining that the second register response is the expected register response, determine whether the identifier information is processed; and responsive to determining that the identifier information is not processed, repeat the identify a current unit of an identifier information to transmit to determine whether the identifier information is processed.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The elements of the drawings are not necessarily to scale, emphasis instead being placed upon clearly illustrating the principles of the invention. Throughout the drawings, like numerals are used for like and corresponding parts of the various drawings.

DETAILED DESCRIPTION

Munitions, such as, by way of example, missile systems, are stored most of their lives. The munitions remain dormant while stored and the condition of the munitions are not readily known. While stored, the munitions may become inoperable for one or more reasons, such as, by way of example, humidity, temperature, vibration, low power, component failure, and the like. At a time a particular piece of munitions is needed, the munitions may be "down" and not operable for one or more reasons. Therefore, the condition of the munitions have to be periodically and repeatedly ascertained in order to ensure the readiness of the munitions.

These munitions are typically stored in the thousands without adequate location or identification information. To determine the diagnostic condition of the munitions, an individual typically mounts a computer, such as a laptop computer, next to each piece of stored munitions, and executes one or more programs which communicate with the munitions to determine the munitions' health (i.e., diagnostic condition). Thus, to repeatedly obtain the health of thousands of stored munitions is extremely time consuming.

The registration system and corresponding methods of the present invention create a networked environment that facilitates communication between a control or base node and one or more remote nodes. The base node, which is analogous to the aforementioned laptop computer, can be carried to a location proximate to where the munitions are stored. Each remote node can be coupled to one or more pieces of munitions and can function to communicate with, and provide one or more items of diagnostic data to the base node. When carried to a location proximate to where the munitions are stored, the base node can be instructed or prompted to communicate with the remote nodes utilizing a communication medium conforming to, by way of example, one or more wireless communication protocols. Utilizing the communication medium, the base node can register the remote nodes to create a network environment. During registration, the base node determines the identity and/or identification information necessary to identify and communicate with a particular remote node. Once one or more remote nodes are registered into the network environment, the base node can request and obtain one or more items of diagnostic information from the registered remote nodes.

The embodiments of the present invention and their advantages will now be further detailed by referring to FIGS. 1–6 of the drawings. Even though the embodiments of the registration system and corresponding methods are described with reference to munitions systems, those of ordinary skill in the art will appreciate that the registration system may be readily applied to other environments where a network participant desires to communicate with one or more other network participants whose identity is not known beforehand. Furthermore, it will also be apparent to those skilled in the art that the registration process of the present invention is suitable for various types of networks, including both wired, wireless, and any combination thereof, and various types of applications other than diagnostic applications.

Turning first to the nomenclature of the specification, the detailed description that follows is presented largely in terms of processes and symbolic representations of operations performed by conventional and/or application specific computers, including computer components. A computer may be any microprocessor or processor (hereinafter referred to as processor) controlled device such as, by way of example, personal computers, workstations, servers, clients, minicomputers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker. Additionally, the computer includes memory such as a memory storage device or an addressable storage medium.

The computer may be a uniprocessor or multiprocessor machine. Additionally the computer, and the computer memory, may advantageously contain program logic or other substrate configuration representing data and instructions, which cause the computer to operate in a specific and predefined manner as, described herein. The program logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

The program logic can be maintained or stored on a computer-readable storage medium. The term "computer-readable storage medium" refers to any medium that participates in providing the symbolic representations of operations to a processor for execution. Such media may take many forms, including, without limitation, volatile memory, nonvolatile memory, electronic transmission media, and the like. Volatile memory includes, for example, dynamic memory and cache memory normally present in computers. Nonvolatile memory includes, for example, optical or magnetic disks.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as, by way of example, read-only memory (ROM).

Figure 1:
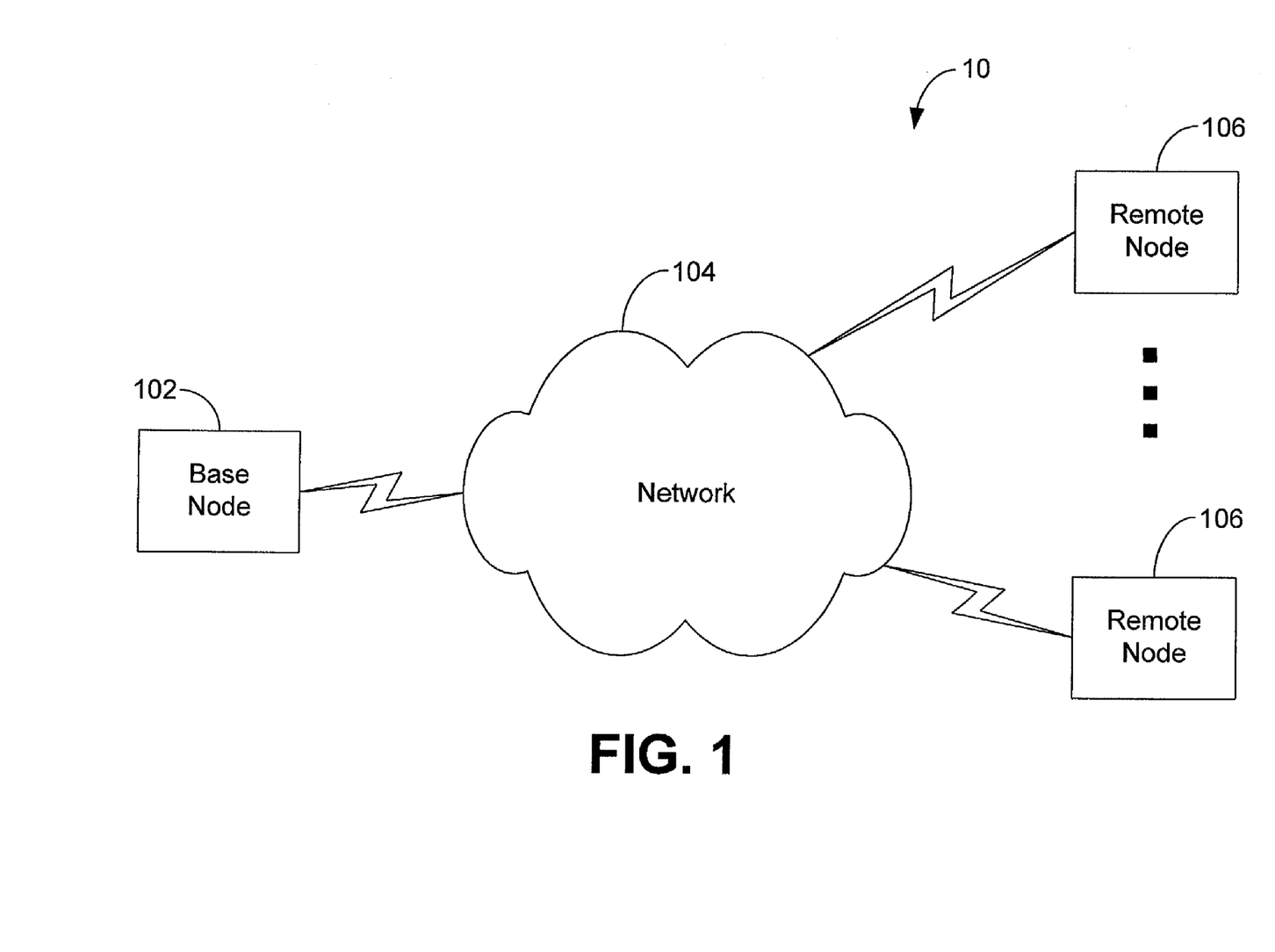
FIG. 1 is a diagram illustrating an exemplary environment in which a system of the present invention may operate.

Referring now to the drawings, FIG. 1 illustrates an exemplary environment in which a system 10 according to one embodiment may operate. As depicted, system 10 includes a base node 102 coupled to one or more remote nodes 106. In particular, base node 102 and remote nodes 106 are coupled through a network 104. As used herein, the terms "connected," "coupled," or any variant thereof, means any connection or coupling, either direct or indirect, between two or more elements; the coupling or connection between the elements can be physical, logical, or a combination thereof.

Base node 102 generally functions to request and facilitate the registration of one or more remote nodes 106. Base node 102 includes program logic to initiate and enable communication with and registration of one or more remote nodes 106. Base node 102 can also include program logic to request and obtain diagnostic information from one or more registered remote nodes 106.

In one embodiment, base node 102 may be a handheld computing device, such as, by way of example, a personal digital assistant (PDA), a portable computing device, and the like. Base node 102 may provide an interface through which a user can initiate the registration process. Once initiated, base node 102 can transmit, for example, a broadcast message, which requests registration from remote nodes 106 capable of receiving the transmitted broadcast message. Base node 102 then listens for and receives responses to the registration request transmitted by one or more remote nodes 106 and proceeds to register the remote nodes 106 as described herein. In other embodiments, base node 102 may be other computing devices, such as, by way of example, laptop computers, servers, desktop computers, and the like, capable of and suitable for performing the registration process as described herein. Base node 102 and the registration process are further described below.

Remote node 106 generally functions to respond to registration requests transmitted by base node 102 and provide any requested diagnostic information regarding its corresponding munitions system. Remote node 106 includes program logic to detect and/or receive registration requests transmitted by base node 102 and to register with base node 102. Remote node 106 may also include program logic to obtain and provide diagnostic information regarding one or more munitions systems.

In one embodiment, remote node 106 may be a control device that is coupled to a munitions system. Remote node 106 can periodically monitor the munitions system to ascertain the diagnostic condition and health of the coupled munitions system. Remote node 106 may additionally receive registration request messages and participate in the corresponding registration process as described herein. In other embodiments, remote node 106 can be coupled to and monitor more than one munitions system. Remote node 106 is further described below.

Network 104 generally provides a communications medium suitable for facilitating communication between coupled devices such as base node 102 and remote nodes 106. Network 104 allows base node 102 and remote nodes 106 to communicate with each other during the registration process as described herein.

In one embodiment, network 104 may include a communications system that supports a variety of communications, such as, by way of example, a radio frequency (RF), specialized mobile radio (SMR), analog cellular, digital cellular, personal communication system (PCS), Cellular Digital Packet Data (CDPD), RAM mobile data, Enhanced Specialized Mobile Radio (ESMR), infrared (e.g., IRDA), and the like. Network 104 may support and utilize one or more communications protocols such as, by way of example, Bluetooth, Inband, Integrated Services Digital Network (ISDN), Signaling System 7 (SS7), Enhanced Throughput Cellular (ETC), Enhanced Cellular Control (EC2), Mobile Data Link Protocol, and the like.

In other embodiments, network 104 may support a wired communication medium and protocol. For example, network 104 may include a local area network (LAN) configured in one or more of various configurations or topologies, such as, by way of example, Ethernet, token ring, wheel and spoke, and the like. Network 104 may also support the Internet and the World Wide Web. In still other embodiments, network 104 may support any combination of the aforementioned wireless and wired communications and corresponding communication protocols.

Figure 2:
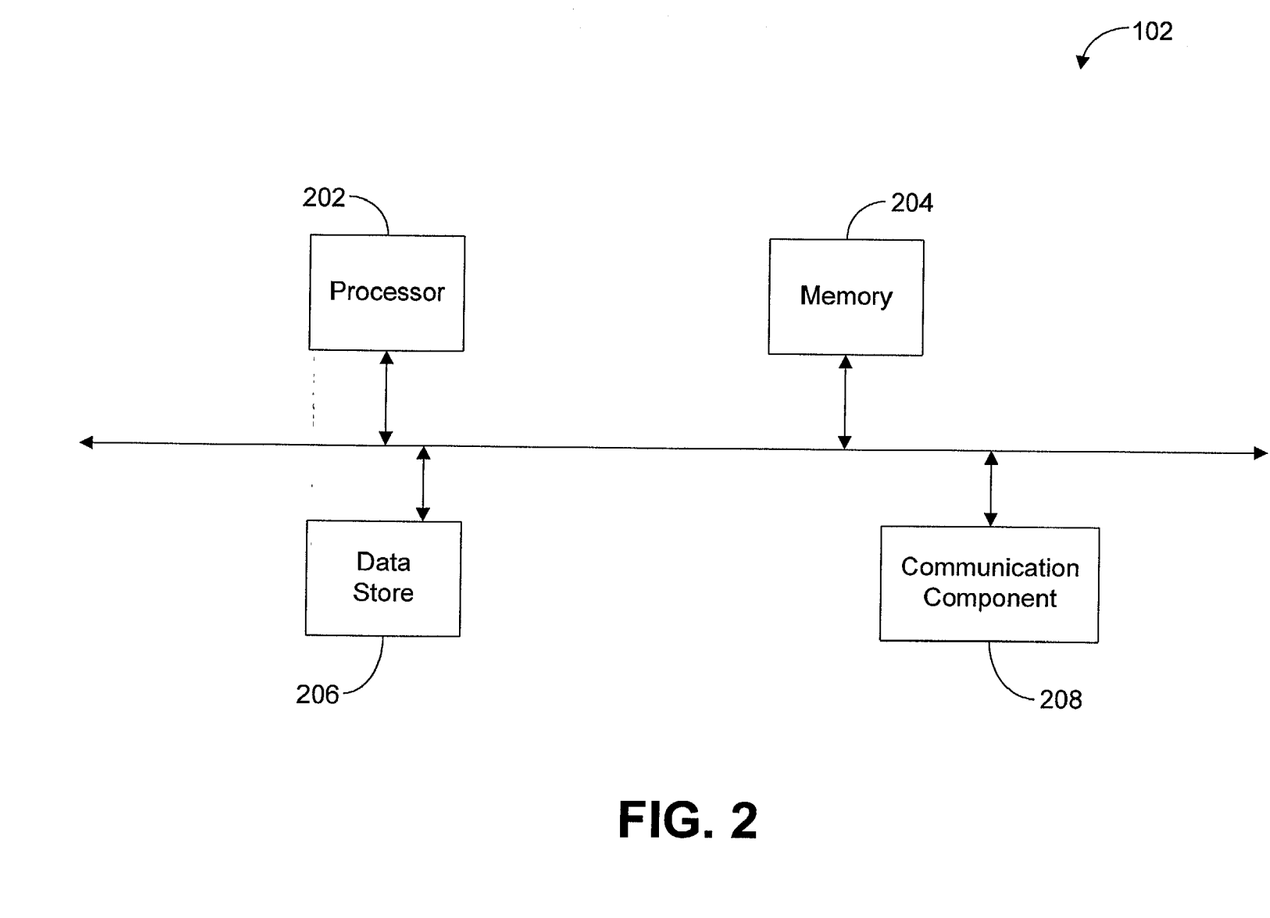
FIG. 2 illustrates selected components of a base node, according to one embodiment.

FIG. 2 illustrates selected components of base node 102, according to one embodiment. As depicted, base node 102 includes a processor 202, a memory 204, a data store 206, and a communication component 208. Processor 202 generally functions to control the operation of one or more components of base node 102. For example, processor 202 executes the program logic designed to facilitate the registration of remote nodes 106 as disclosed herein.

Memory 204 is coupled to processor 202 and includes computer readable storage medium. Memory 204 generally functions to maintain and provide program logic, including units of information and data, to processor 202 for execution. For example, processor 202 accesses the information and data, including the program logic, stored in memory 204 to perform the registration process.

Data store 206 is coupled to processor 202 and memory 204. Data store 206 generally functions to store registration data and information. Data store 206 can also store the program logic that is executed by processor 202. Communication component 208 is coupled to processor 202, memory 204, and data store 206. Communication component 208 generally functions to provide communication with remote nodes 106 over network 104. Among other functions, communications component 208 may transmit and receive messages over network 104.

Figure 3:
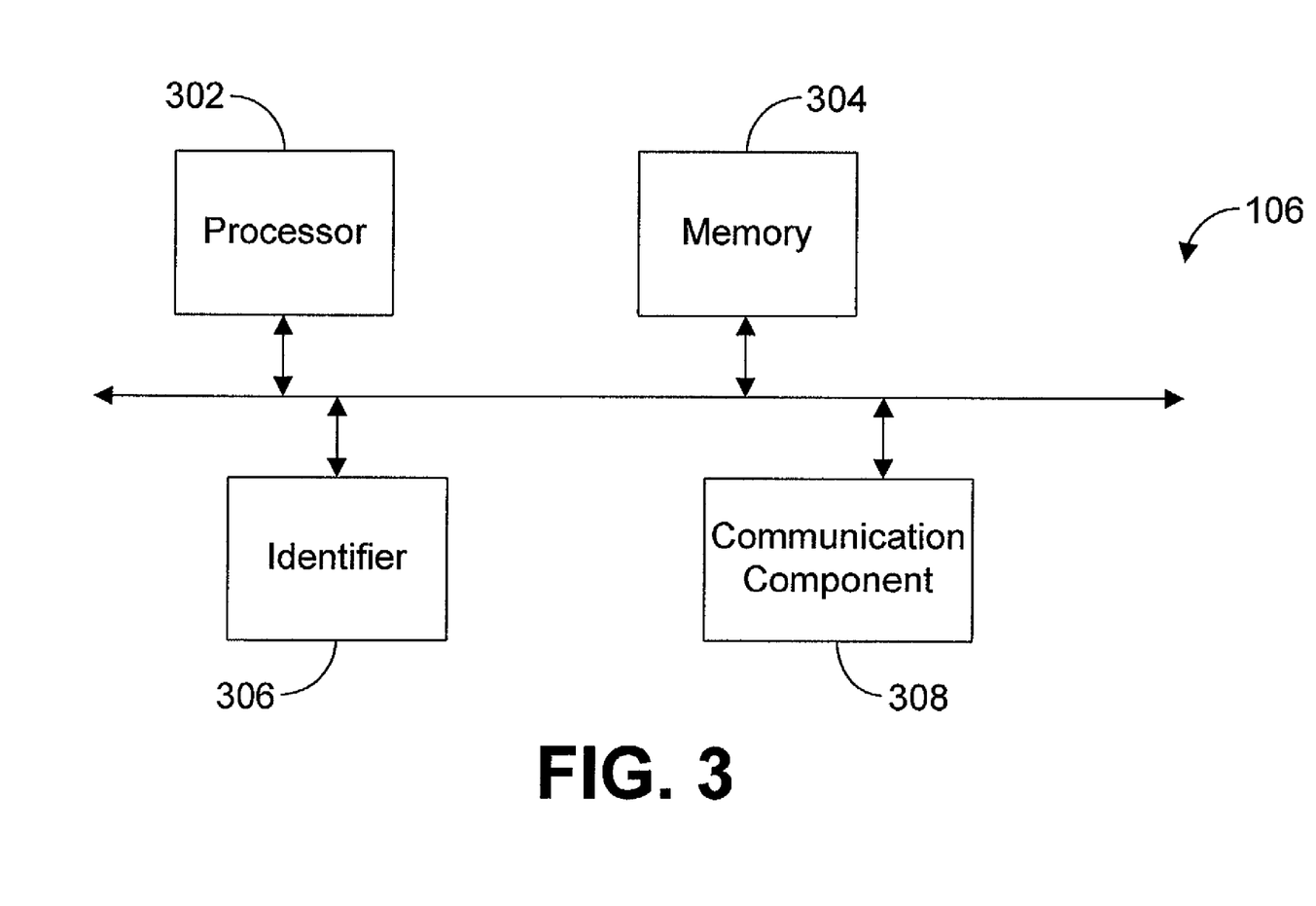
FIG. 3 illustrates selected components of a remote node, according to one embodiment.

FIG. 3 illustrates exemplary components of remote node 106, according to one embodiment. As depicted, remote node 106 includes processor 302, memory 304, identifier 306, and communication component 308. Processor 302 generally functions to control the operation of remote node 106. For example, processor 302 executes program logic to participate in the registration process as disclosed herein. Processor 302 may also execute program logic to obtain the diagnostic health and condition of one or more munitions systems and accordingly provide the diagnostic information to base node 102.

Memory 304 is coupled to processor 302 and includes computer readable storage medium. Memory 304 generally functions to maintain and provide program logic, including units of information and data, to processor 302 for execution. For example, processor 302 accesses the information and data, including the program logic, stored in memory 304 to participate in the registration of remote node 106.

Identifier 306 is coupled to processor 302 and memory 304. Identifier 306 generally functions to provide a unique identifier for remote node 106. In one embodiment, identifier 306 is a unique network address that is used to communicate with remote node 106. In another embodiment, identifier 306 can be information or data (e.g., serial number) that can be used to uniquely identify remote node 106. For example, identifier 306 can be implemented as an index into a database of unique identifiers (e.g., unique addresses, serial numbers, etc.). Thus, identifier 306 can reference a database location containing a unique identifier for remote node 106. The database can be maintained on base node 102 or other suitable computing or storage device. In other embodiments, identifier 306 can reference a database location that contains other information, such as, by way of example, information and data pertaining to the munitions system or other apparatus coupled to remote node 106.

Communication component 308 is coupled to processor 302, memory 304, and identifier 306. Communication component 308 generally functions to provide communication with base node 102 over network 104. Communication component 308 may also provide communication with other devices coupled to and/or accessible over network 104, such as, by way of example, other remote nodes 106. Among other functions, communications component 308 may transmit and receive messages over network 104. In another embodiment, communication component 308 may also provide communication with one or more munitions systems, thus, enabling remote node 106 to obtain diagnostic information regarding the one or more munitions systems.

One of ordinary skill in the art will appreciate that the depicted components and modules are only exemplary and that the functionality provided for in the components, modules, and databases may be combined into fewer components, modules, or databases or further separated into additional components, modules, or databases. In some embodiments, one or more of the functions provided by the modules, components, and databases may be optional and not implemented or present.

Figure 4:
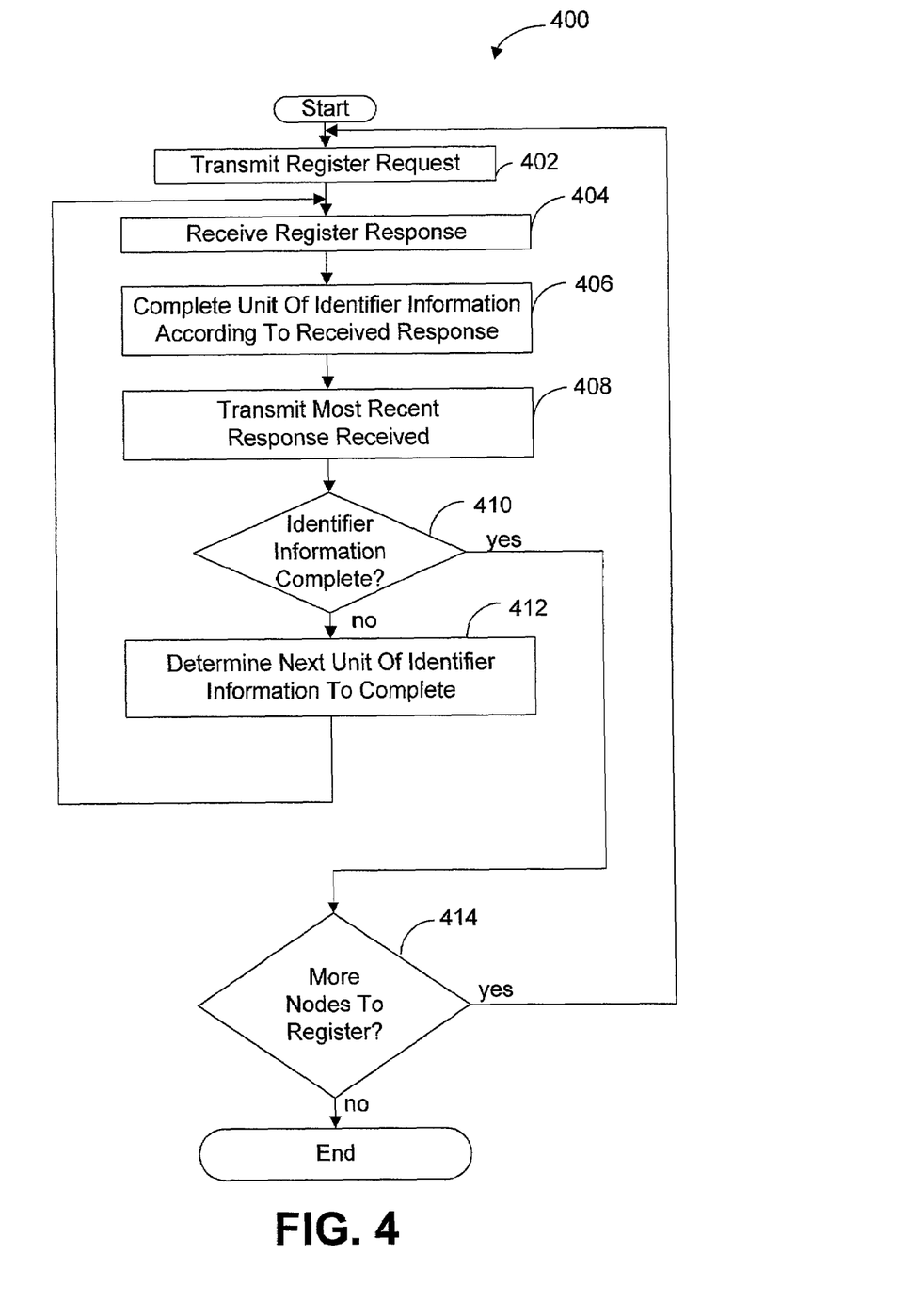
FIG. 4 is a flow chart of an exemplary method of operation for a base node, in accordance with one embodiment of the present invention.

FIG. 4 is a flow chart of an exemplary method 400 of operation for base node 102, in accordance with one embodiment of the present invention. In particular, exemplary method 400 outlines a process by which base node 102 requests and registers remote nodes 106. During method 400, base node 102 and one or more unidentified and/or unknown remote nodes 106 interact to perform an identification and a registration of remote nodes 106 with base node 102, which enables base node 102 to subsequently communicate with one or more of the registered remote nodes 106.

By way of example, a user (e.g., person) may want to discern the current condition of one or more stored munitions systems. These munitions systems may be stored in a suitable munitions storage area. Each munitions system may be coupled to a status communication device, such as remote node 106 described herein, that is operable to communicate and interact with a host device, such as base node 102 described herein, to report the condition or status of the coupled munitions system. Furthermore, the user and, in particular, the host device used to obtain the status of the stored munitions systems, does not have a priori knowledge of the status communication devices respectively coupled to the munitions systems. The user wanting to obtain information regarding the condition of the stored munitions systems can transport the host device to the proximate location of the stored munitions systems. The host device needs to be sufficiently close to the status communication devices to enable proper communication and interaction between the devices. One of ordinary skill will appreciate that the proximity of the devices is dependent on, among other factors, the employed communication medium and protocol.

Although the example and description describes steps being performed by a human user (i.e., user wanting to discern the current condition of one or more stored munitions systems) interacting with, for example, the host device, it should be understood that some or all of the steps and/or actions of the user can be performed automatically by the host device. For example, a host device coupled to a network may be programmed to interrogate the network to identify and register the network participants as disclosed herein.

Referring again to exemplary method 400, during a start step, the user can transport base node 102 to the storage area and initiate a registration process, for example, by powering on base node 102 and inputting a predetermined command. At step 402, base node 102 transmits a register request. The register request is a message (e.g., a signal, bit sequence, command sequence, etc.) that base node 102 and remote node 106 recognizes and understands to be the start of a registration cycle of the registration process. In another embodiment, base node 102 may transmit a synchronize message (e.g., synchronize bit, nibble, byte, word, etc.) in addition to the register request, which is used by remote nodes 106 to synchronize their transmissions.

At step 404, base node 102 listens for and detects or receives a register response transmitted by one of remote nodes 106. Base node 102 delays or waits a sufficient length of time to receive the register response. For example, if the register response includes either a transmission of a single bit (i.e., a transmission of a single bit value '1') or no transmission at all (i.e., silence to signify a transmission of a bit value '0'), base node 102 may wait proximately one bit time (i.e., time necessary to receive a transmission of one bit), plus any predetermined delay, to receive the register response. If the register response includes a transmission of a different length message, base node 102 delays or waits for a time period sufficient to receive that transmission.

At step 406, base node 102 completes a unit of identifier information according to the register response received at step 404. In one embodiment, the identifier information is a binary sequence that uniquely identifies each remote node 106, and a unit of identifier information is a bit in the binary sequence. Examples of a binary sequence include, without limitation, a network address, a binary representation of a serial number, a binary representation of any other unique identifier, and the like.

Continuing the above example, if any remote node 106 transmits a single bit value '1' and base node 102 receives this transmission, base node 102 equates the current unit of identifier information (e.g., the most significant bit to be processed in the identifier information) to a value of '1'. Alternatively, if none of the remote nodes 106 transmits a response, base node 102 understands and interprets the lack of transmission to be a transmission of a single bit value '0' and equates the current unit of identifier information to a value of '0'. The identifier information can be maintained in a database of identifiers. In other embodiments, base node 102 and remote node 106 can use different bit sequences to represent bit value '0' and bit value '1'. For example, a transmission of a bit sequence of '1111' can be used to designate bit value '1'.

At step 408, base node 102 transmits the most recent register response received. For example, if base node 102 most recently received a bit value '1', base node 102 transmits a bit value '1'. Alternatively, if base node 102 most recently received a bit value '0' (i.e., base node 102 did not receive a transmission from any remote nodes 106), base node 102 transmits a bit value '0' (e.g., base node 102 does not transmit for a predetermined amount of time). In other embodiments, base node 102 can transmit different bit sequences that are understood by remote nodes 106 as representing bit value '0' or bit value '1'.

At step 410, base node 102 checks to determine whether the identifier information is complete. Base node 102 determines whether it has received and completed a complete identifier information. Continuing the above example, base node 102 checks to determine whether it has completed an identifier information that is associated with and identifies a particular remote node 106. For example, if each identifier information is a 16-bit binary sequence, base node 102 checks to see if it has completed all 16 bits of the identifier information.

If, at step 410, base node 102 determines that the identifier information is not complete, then base node 102 determines the next unit of identifier information that needs to be completed at step 412. Continuing the above example, base node 102 may have just completed the tenth bit of the 16-bit sequence. In other words, the most significant ten bits of the 16-bit identifier information is completed. Here, base node 102 appropriately designates the eleventh bit of the 16-bit sequence as the next bit (i.e., the next unit of identifier information) base node 102 needs to complete. Base node 102 uses the next register response received to complete the eleventh bit in the 16-bit sequence.

Base node 102 continues processing the registration of remote nodes 106 (i.e., continues processing the current cycle of the registration process) at step 404. Base node 102 repeats steps 404 to 412 until an identifier information associated with a particular remote node 106 is completed (e.g., remote node 106 associated with the completed identifier information is registered with and identified by base node 102).

If, at step 410, base node 102 determines that the identifier information is complete, base node 102 checks to determine whether there are more remote nodes 106 to register at step 414. In one embodiment, base node 102 determines whether the most recently completed identifier information is a sequence of all zeros. A sequence of all zeros does not identify any remote node 106. In another embodiment, the number of remote nodes 106 may be previously provided to base node 102. Here, base node 102 may maintain a count of the number of registered remote nodes 106.

If, at step 414, base node 102 determines that there are additional remote nodes 106 to register, base node 102 transmits a register request at step 402 (i.e., begins another cycle of the registration process). Base node 102 repeats steps 402 to 412 until a desired number of remote nodes 106 have been registered and identified. For example, base node 102 may be programmed to register a single remote node 106. Subsequent to registering remote node 106, base node 102 can interact with the registered remote node 106 to obtain any desired information, such as status information regarding the munitions system. In another implementation, base node 102 may be programmed to register remote nodes 106 in groups, such as in groups of six. For example, base node 102 may utilize a registry table that can hold six identifiers. Subsequent to registering six remote nodes 106, base node 102 can interact with the six registered remote nodes 106, for example, one at a time, to obtain any desired information. One of skill in the art will realize that during the interaction between base node 102 and remote node 106, base node 102 can disseminate information, including commands, to remote node 106.

If, at step 414, base node 102 determines that it has registered the necessary number of remote nodes 106 or that no remote nodes 106 responded to the most recently issued register request (e.g., the most recently completed identifier information is a sequence of all zeros), base node 102 terminates the registration process.

In another embodiment, base node 102 can transmit a confirmation message subsequent to registering a particular remote node 106. The confirmation message may be any transmission that is understood by base node 102 and remote nodes 106 to be a confirmation of a successful registration. For example, the confirmation message can be a transmission of a bit sequence that represents the identifier information (i.e., the unique identifier).

In exemplary method 400, the identifier information is a bit sequence comprised of zeros and ones. In other embodiments, the identifier information may be information that can be derived from the bit sequence transmitted and received during the registration process. For example, the identifier information can be comprised of a sequence of characters (e.g., one or more character sets), where each character is represented by a unique bit sequence. Therefore, the identifier information can include data, such as, by way of example, name, address, phone number, model number, and the like.

Those of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps without detracting from the essence of the invention.

Figure 5:
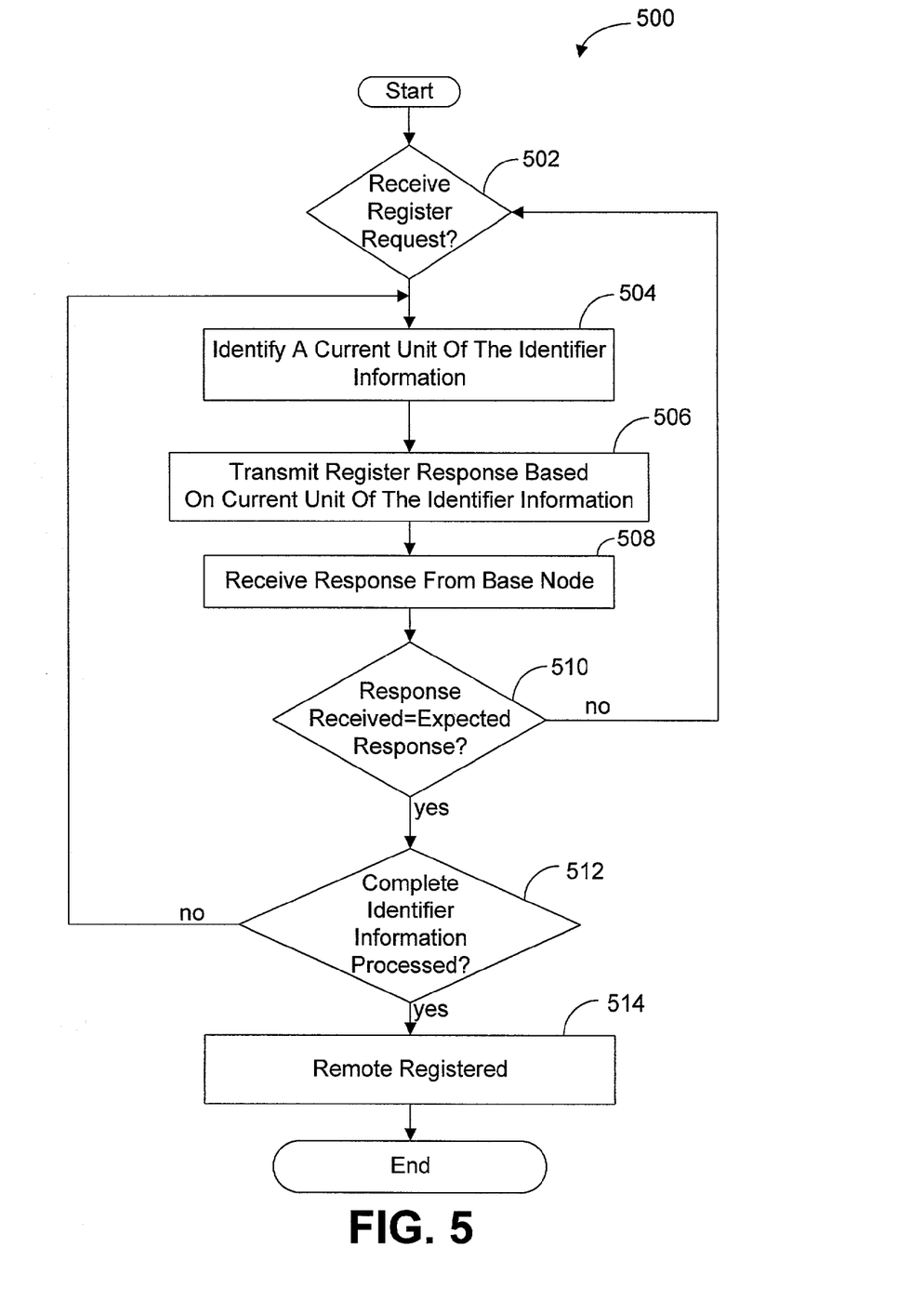
FIG. 5 is a flow chart of an exemplary method of operation of a remote node, in accordance with one embodiment of the present invention.

FIG. 5 is a flow chart of an exemplary method 500 of operation of remote node 106, in accordance with one embodiment of the present invention. In particular, exemplary method 500 outlines a process by which remote node 106 participates in the registration process as illustrated by exemplary method 400. Beginning at a start step, remote node 106 listens for a register request message at step 502. The register request message is transmitted by base node 102.

If, at step 502, remote node 106 receives a register request message, remote node 106 identifies a current unit of identifier information to process at step 504. For example, if the identifier information is a binary sequence representing its network address, remote node 106 identifies the appropriate bit in the binary sequence to transmit in response to receiving the register request message. In this embodiment, since it is the start of a cycle of the registration process, remote node 106 can identify the most significant bit in the binary sequence as the unit of identifier information to process. In another embodiment, remote node 106 may identify the least significant bit in the binary sequence as the unit of information to process. In this instance, base node 102 and remote nodes 106 are under an a priori understanding that the binary sequence representing the identification information is to be processed form least to most significant bit.

In another embodiment, remote node 106 may wait to receive a synchronize message in addition to the register request. Remote node 106 can use the synchronize message to synchronize its transmission. If a synchronize message is not received within a predetermined amount of time, remote node 106 returns to step 502 and waits to receive another registration request message. If a synchronize message is received within the predetermined amount of time, remote node 106 identifies a current unit of identifier information to process at step 504.

At step 506, remote node 106 transmits a signal or message representing the unit of identification information identified at step 504. For example, if the unit of identification information is a bit value '1', then remote node 106 transmits a '1'. Alternatively, if the unit of identification information is a bit value '0', then remote node 106 does not transmit and waits proximately one bit time. At step 508, remote node 106 listens for and receives a response message transmitted by base node 102. For example, the response message is the most recent register response transmitted by base node 102 at step 408 of exemplary method 400.

At step 510, remote node 106 checks to determine if the received response message is a response that remote node 106 expects. In one embodiment, remote node 106 expects a response message that represents the most recent unit of identification information that remote node 106 transmitted (i.e., at step 506). For example, if remote node 106 transmitted a message representing a bit value '1', then it expects to receive a response message that represents or signifies that base node 102 received a message that represents bit value '1' from any one or more of remote nodes 106. Alternatively, if remote node 106 transmitted a message representing a bit value '0' (i.e., silence/no transmission), then it expects to receive a response message that represents or signifies that base node 102 received a message that represents bit value '0' from remote nodes 106 participating in the current cycle of the registration process.

If, at step 510, remote node 106 determines that the received response message is not the response message it expected, remote node 106 withdraws from the registration process and returns to step 502 to wait for another register request message (i.e., waits for another cycle of the registration process to start). For example, remote node 106 may have transmitted a response message representing bit value '0' (step 506), but one or more other remote nodes 106 may have transmitted a response message representing bit value '1'. In this instance, remote node 106 receives a response message representing bit value '1' that is transmitted by base node 102, which indicates that one or more other base nodes 106 transmitted a response message representing bit value '1'.

Alternatively, if, at step 510, remote node 106 determines that the received response message is the response message it expected, remote node 106 checks to determine if the identifier information is processed at step 512. For example, remote node 106 checks to determine if it has transmitted all the bits in the binary sequence that represents the identifier information. If remote node 106 determines that the identifier information is processed, remote node 106 considers itself to be identified by, and registered with base node 102 at step 514 and exits the registration process. Here, remote node 106 received a confirmation or response subsequent to each unit of identifier information it transmitted, and remote node 106 basis the registration upon the collection of confirmations it received.

In another embodiment, remote node 106 may wait a predetermined amount of time to receive a confirmation message. The confirmation message is an acknowledgement that remote node 106 is successfully registered with base node 102. If a confirmation message is not received within the predetermined amount of time, base node 106 considers itself not registered and returns to step 502 to wait for another register request message. For example, the confirmation message may include the address of the registered remote node 106. In this instance, remote node 106 can check to determine if the address contained in the confirmation message is its address. If the two addresses are the same, remote node 106 can consider itself registered.

If, at step 512, remote node 106 determines that the identifier information is not processed (e.g., there is more of the binary sequence representing the identifier information to transmit), remote node 106 repeats steps 504 to 512 until it becomes registered or withdraws from the current cycle of the registration process. In particular, remote node 106 returns to step 504 and identifies a current unit of identifier information to process. For example, remote node 106 may have just transmitted and received confirmation of, the fifth bit of a 16-bit sequence that represents the identification information. In other words, the most significant five bits of the 16-bit identifier is processed. Here, remote node 106 appropriately identifies the sixth bit of the 16-bit sequence as the next bit (i.e., the next unit of identifier information) remote node 106 needs to transmit (i.e., at step 506).

Figure 6:
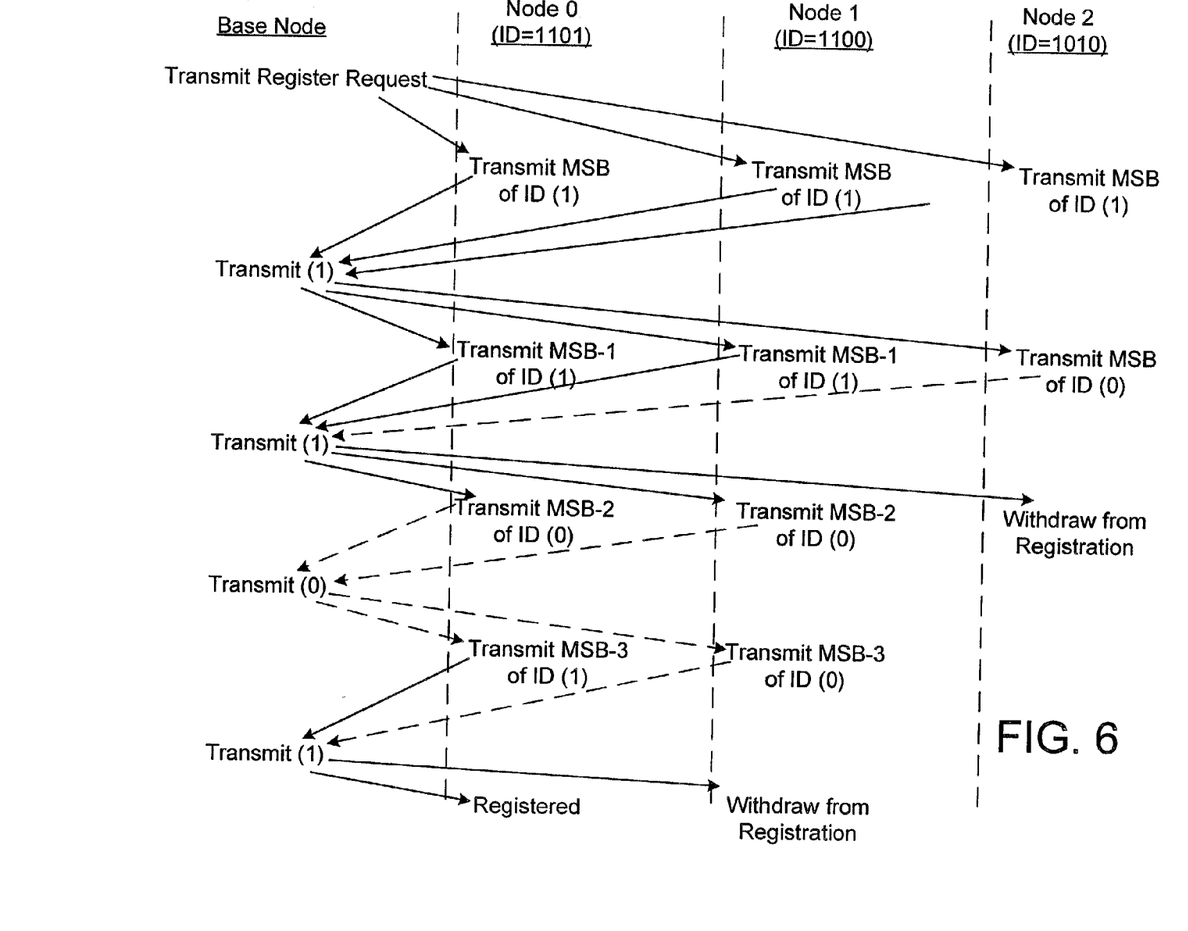
FIG. 6 is a diagram illustrating a registration example between a base node and three remote nodes.

FIG. 6 is a diagram illustrating a registration example between base node 102 and three remote nodes 106. In particular, FIG. 6 illustrates one cycle of the registration process. As depicted, there is one base node 102, designated as "Base Node," and three remote nodes 106, designated as "Node 0," "Node 1," and "Node 2." Node 0 is associated with identifier '1101', Node 1 is associated with identifier '1100', and Node 2 is associated with identifier '1010'. The registration process example includes the transmission of the identifier one bit at a time, beginning with the most significant bit and proceeding to the least significant bit. Therefore, remote node 106 having the higher valued identifier is registered prior to another remote node 106 having a lower valued identifier. Even though identifiers having a length of four bits are used in the example, those of ordinary skill in the art will appreciate that the registration process disclosed herein is suited for identifiers (i.e., identifier information) of potentially any length.

Referring again to the registration example depicted in FIG. 6, Base Node initiates a cycle of the registration process by transmitting a register request message. Node 0, Node 1, and Node 2 detect and receive the register request message. In our example, none of the remote nodes are registered and all of the remote nodes want to be registered. In response to the register request, Node 0, Node 1, and Node 2 each transmit the most significant bit of its identifier, a '1'.

Base Node listens for, detects and receives the '1' that is transmitted by Node 0, Node 1, and Node 2. Base Node proceeds to transmit a '1' in response to receiving the '1' transmitted by at least one of the remote nodes. Node 0, Node 1, and Node 2 detect and receive the '1' transmitted by Base Node. Each remote node checks to determine whether the received '1' is the same as the most recently transmitted bit of its identifier (i.e., the most significant bit of the identifier). In the example, each remote node determines that the received '1' is the same as the most recently transmitted bit of its identifier.

In response to the determining that the received '1' is the same as the most recently transmitted bit of its identifier, Node 0, Node 1, and Node 2 transmit the next most significant bit of its identifier. In particular, Node 0 and Node 1 each transmit a '1', while Node 2 transmits a '0' (i.e., Node 2 does not transmit). In FIG. 6, dotted or dashed lines depict no transmission or silence. Base Node listens for and receives the '1' that is transmitted by Node 0 and Node 1. Base Node proceeds to transmit a '1' in response to receiving the '1' transmitted by at least one of the remote nodes.

Subsequently, Node 0, Node 1, and Node 2 detect and receive the '1' transmitted by Base Node. Each remote node checks to determine whether the received '1' is the same as the most recently transmitted bit of its identifier (i.e., the next most significant bit of the identifier). In the example, Node 0 and Node 1 determine that the received '1' is the same as the most recently transmitted bit of its identifier. Conversely, Node 2 determines that the received '1' is not the same as the most recently transmitted bit of its identifier and, thus, withdraws from the current registration cycle.

In response to the determining that the received '1' is the same as the most recently transmitted bit of its identifier, Node 0 and Node 1 each transmit the third most significant bit of its identifier. In particular, Node 0 and Node 1 transmit a '0' (i.e., does not transmit). Base Node listens for and receives the '0' that is transmitted by Node 0 and Node 1 (i.e., Base Node did not detect or receive a transmission for a predetermined amount of time). Upon failing to receive a '1', Base Node proceeds to transmit a '0'in response to receiving the '0' transmitted (e.g., no detected transmission) by the remote nodes still participating in the registration cycle (i.e., Node 0 and Node 1).

The remote node still participating in the registration cycle, Node 0 and Node 1, receive the '0' transmitted by Base Node (i.e., Node 0 and Node 1 did not detect or receive a transmission for a predetermined amount of time). Node 0 and Node 1 check to determine whether the received '0' is the same as the most recently transmitted bit of its identifier (i.e., the third most significant bit of the identifier). In the example, Node 0 and Node 1 each determine that the received '0' is the same as the most recently transmitted bit of its identifier.

In response to the determining that the received '0' is the same as the most recently transmitted bit of its identifier, Node 0 and Node 1 transmit the least significant bit of its identifier. In particular, Node 0 transmits a '1', while Node 1 transmits a '0' (i.e., Node 1 does not transmit). Base Node listens for and receives the '1' that is transmitted by Node 0. Base Node proceeds to transmit a '1' in response to receiving the '1' transmitted by at least one of the remote nodes.

Node 0 and Node 1 each receive the '1' transmitted by Base Node, and each checks to determine whether the received '1' is the same as the most recently transmitted bit of its identifier (i.e., the least significant bit of the identifier). In the example, Node 0 determines that the received '1' is the same as the most recently transmitted bit of its identifier. Subsequently, Node 0 checks to see if all the bits in its identifier have been processed (e.g., transmitted and acknowledged), and upon determining that its identifier has been processed, Node 0 considers itself registered with the Base Node. Conversely, Node 1 determines that the received '1' is not the same as the most recently transmitted bit of its identifier and, thus, withdraws from the current registration cycle.

In an alternative embodiment, concurrent with or shortly after transmitting a '0' (i.e., not transmitting), remote node 106 listens, for a predetermined amount of time, for transmissions by the other remote nodes 106. For example, remote node 106 transmits a '0' if its current unit of identification information is a bit value '0' (e.g., at step 506 in exemplary method 500). In this instance, remote node 106 listens for a transmission of a '1' by any of the other remote nodes 106. If remote node 106 detects or hears a '1' being transmitted during the predetermined amount of time (e.g., remote node 106 determines that there exists at least one other remote node 106 participating in the registration cycle that has registration priority), remote node 106 withdraws from the current registration cycle without having to wait on, and having to check a confirmation message from base node 102.

In another alternative embodiment, the registration process can include an error detection scheme. For example, base node 102 can transmit a checksum, cyclic redundancy check, or any other appropriate error detection mechanism, along with a confirmation message used to acknowledge a successful registration. The error detection mechanism can be treated as an extension of the basic address field usually present in network transmissions.

In yet another alternative embodiment, base node 102 can transmit information that specifies what unit of identification information is to be used as a starting point in the registration process. A variation of the register request message can include information as to which bit in the identification information (e.g., network address, etc.) is to be transmitted by remote nodes 106 in response to the registration request. For example, base node 102 may have determined from a first pass through a registration cycle that the first N bits of the responding identification information were all zeros. Then, base node 102 can instruct remote nodes 106 to start a subsequent registration process beginning with the N+1 position of the identification information. A technical advantage is that the time required to identify and register remote nodes 106 is reduced or minimized. Furthermore, the registration process illustrated by exemplary methods 400 and 500, which require the registration of each bit or unit of the identification information on each pass through the registration process, becomes the worst case scenario with regard to registration time.

One technical advantage of the present invention is that the amount of time required to complete a single registration cycle (i.e., to register a single remote node 106) is deterministic. The aforementioned amount of time is dependent only on the length of the identification information (e.g., length of the network address) and the inherent delays associated with transmitting and receiving components included in base node 102, network 104, and remote node 106. Moreover, the amount of time is not affected by collisions caused by simultaneous transmissions from multiple remote nodes 106. Furthermore, the amount of time is independent of the number of remote nodes 106 responding to a transmit request.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. A method of registering nodes comprising:
   transmitting a register request;
   receiving a first register response;
   completing a unit of an identifier information based on the received register response;
   transmitting a second register response based on the first register response;
   determining whether the identifier information is complete; and
   responsive to determining that the identifier information is not complete, repeating the receiving a first register response to the determining whether the identifier information is complete.

2. The method of claim 1, wherein the second register response is the same as the first register response.

3. The method of claim 1, wherein the identifier information comprises a unique address.

4. The method of claim 3, wherein the unit of the identifier information is a bit in the unique address.

5. The method of claim 1 further comprising determining a next unit of the identifier information to complete.

6. The method of claim 1 further comprising, subsequent to transmitting the register request, transmitting a synchronize message.

7. The method of claim 1 further comprising, responsive to determining that the identifier information is complete, transmitting an acknowledgement message.

8. The method of claim 7, wherein the acknowledgement message comprises the identifier information.

9. The method of claim 7, wherein the acknowledgement message comprises an error detection scheme.

10. The method of claim 9, wherein the error detection scheme comprises a checksum.

11. The method of claim 9, wherein the error detection scheme comprises a cyclic redundancy check.

12. The method of claim 1 further comprising transmitting a registration starting position, the registration starting position identifying a position in the identifier information.

13. The method of claim 12, wherein the registration starting position is transmitted as part of the register request.

14. The method of claim 1, wherein the transmitting and receiving comprise transmitting and receiving over a wireless communication medium.

15. The method of claim 1, wherein the transmitting and receiving comprise transmitting and receiving over a physical communication medium.

16. The method of claim 1, wherein transmitting the second register response comprises delaying for a time period.

17. A method of participating in a registration process comprising:
receiving a registration request;
identifying a current unit of an identifier information to transmit;
transmitting a first register response based on the current unit of the identifier information;
receiving a second register response;
determining whether the second register response is an expected register response;
responsive to determining that the second register response is the expected register response, determining whether the identifier information is processed; and
responsive to determining that the identifier information is not processed, repeating the identifying a current unit of an identifier information to transmit to determining whether the identifier information is processed.

18. The method of claim 17 further comprising, responsive to determining that the first and second register responses are not the same, withdrawing from the registration process.

19. The method of claim 17 further comprising, subsequent to receiving the registration request, receiving a synchronize message.

20. The method of claim 17 further comprising, responsive to determining that the identifier information is processed, receiving an acknowledgement message.

21. The method of claim 20 further comprising receiving an error detection message.

22. The method of claim 21, wherein the error detection message is received as part of the acknowledgement message.

23. The method of claim 17, wherein transmitting the first register response comprises delaying for a time period.

24. The method of claim 17, wherein the expected register response is the same as the first register response.

25. The method of claim 17, wherein the identifier information comprises a unique address.

26. The method of claim 25, wherein the unit of the identifier information is a bit in the unique address.

27. The method of claim 17 further comprising, subsequent to receiving the registration request, receiving a registration starting position, the registration starting position identifying a position in the identifier information.

28. A method of participating in a registration process comprising:
receiving a registration request;
identifying a current unit of an identifier information to transmit;
delaying for a time period based on the current unit of the identifier information;
during the delay time period, determining whether data is being transmitted;
responsive to determining that data is being transmitted during the delay time period, withdrawing from the registration process;
responsive to determining that data is not being transmitted during the delay time period, determining whether the identifier information is processed; and
responsive to determining that the identifier information is not processed, repeating the identifying a current unit of an identifier information to transmit to determining whether the identifier information is processed.

29. The method of claim 28 further comprising:
responsive to determining that data is not being transmitted during the delay time period, receiving a second register response;
determining whether the second register response is an expected register response; and
responsive to determining that the second register response is the expected register response, determining whether the identifier information is processed.

30. A computer-readable storage medium having stored thereon computer instructions that, when executed by a computer, cause the computer to:
transmit a register request;
listen for and receive a first register response;
complete a unit of an identifier information based on the received register response;
transmit a second register response based on the first register response;
determine whether the identifier information is complete; and
responsive to determining that the identifier information is not complete, repeat the listen for and receive a first register response to the determine whether the identifier information is complete.

31. The computer-readable storage medium of claim 30, wherein the second register response is the same as the first register response.

32. The computer-readable storage medium of claim 30, wherein the identifier information comprises a unique address.

33. The computer-readable storage medium of claim 32, wherein the unit of the identifier information is a bit in the unique address.

34. The computer-readable storage medium of claim 30, wherein the computer instructions that transmit the register request further comprise computer instructions that, when executed by a computer, cause the computer to identify a next unit of the identifier information to complete.

35. The computer-readable storage medium of claim 30, wherein the computer instructions that transmit the register request further comprise computer instructions that, when executed by a computer, cause the computer to, subsequent to transmitting the register request, transmit a synchronize message.

36. The computer-readable storage medium of claim 30, wherein the computer instructions that transmit the register request further comprise computer instructions that, when executed by a computer, cause the computer to, responsive to determining that the identifier information is complete, transmit an acknowledgement message.

37. The computer-readable storage medium of claim 36, wherein the acknowledgement message comprises the identifier information.

38. The computer-readable storage medium of claim 36, wherein the acknowledgement message comprises an error detection scheme.

39. The computer-readable storage medium of claim 30, wherein the computer instructions that transmit the register request further comprise computer instructions that, when executed by a computer, cause the computer to transmit a registration starting position, the registration starting position identifying a position in the identifier information.

40. The computer-readable storage medium of claim 30, wherein transmit the second register response comprises a delay for a time period.

41. A computer-readable storage medium having stored thereon computer instructions that, when executed by a computer, cause the computer to:
- listen for and receive a registration request;
- identify a current unit of an identifier information to transmit;
- transmit a first register response based on the current unit of the identifier information;
- listen for and receive a second register response;
- determine whether the second register response is an expected register response;
- responsive to determining that the second register response is the expected register response, determine whether the identifier information is processed; and
- responsive to determining that the identifier information is not processed, repeat the identify a current unit of an identifier information to transmit to determine whether the identifier information is processed.

42. The computer-readable storage medium of claim 41, wherein the computer instructions that listen for a registration request further comprise computer instructions that, when executed by a computer, cause the computer to, responsive to determining that the first and second register responses are not the same, listen for and receive a subsequent registration request.

43. The computer-readable storage medium of claim 41, wherein the computer instructions that listen for a registration request further comprise computer instructions that, when executed by a computer, cause the computer to, subsequent to receiving the registration request, listen for and receive a synchronize message.

44. The computer-readable storage medium of claim 41, wherein the computer instructions that listen for a registration request further comprise computer instructions that, when executed by a computer, cause the computer to, responsive to determining that the identifier information is processed, listen for and receive an acknowledgement message.

45. The computer-readable storage medium of claim 44, wherein the computer instructions that listen for a registration request further comprise computer instructions that, when executed by a computer, cause the computer to listen for and receive an error detection message.

46. The computer-readable storage medium of claim 45, wherein the error detection message is received as part of the acknowledgement message.

47. The computer-readable storage medium of claim 41, wherein the transmit the first register response comprises a delay for a time period.

48. The computer-readable storage medium of claim 41, wherein the expected register response is the same as the first register response.

49. The computer-readable storage medium of claim 41, wherein the identifier information comprises a unique address.

50. The computer-readable storage medium of claim 49, wherein the unit of the identifier information is a bit in the unique address.

51. The computer-readable storage medium of claim 41, wherein the computer instructions that listen for a registration request further comprise computer instructions that, when executed by a computer, cause the computer to, subsequent to receiving the registration request, listen for and receive a registration starting position, the registration starting position identifying a position in the identifier information.

52. The computer-readable storage medium of claim 51, wherein the registration starting position is part of the register request.

53. A computer-readable storage medium having stored thereon computer instructions that, when executed by a computer, cause the computer to:
- receive a registration request;
- identify a current unit of an identifier information to transmit;
- delay for a time period based on the current unit of the identifier information;
- during the delay time period, determine whether data is being transmitted;
- responsive to determining that data is being transmitted during the delay time period, withdraw from the registration process;
- responsive to determining that data is not being transmitted during the delay time period, determine whether the identifier information is processed; and
- responsive to determining that the identifier information is not processed, repeat the identify a current unit of an identifier information to transmit to determine whether the identifier information is processed.

54. The computer-readable storage medium of claim 53, wherein the computer instructions that receive a registration request further comprise computer instructions that, when executed by a computer, cause the computer to:
- responsive to determining that data is not being transmitted during the delay time period, receive a second register response;
- determine whether the second register response is an expected register response; and
- responsive to determining that the second register response is the expected register response, determine whether the identifier information is processed.

* * * * *